United States Patent
Chuang et al.

(10) Patent No.: US 11,909,315 B2
(45) Date of Patent: Feb. 20, 2024

(54) SWITCHING REGULATOR AND CONTROLLER CIRCUIT AND CONTROL METHOD THEREOF

(71) Applicant: Richtek Technology Corporation, Zhubei (TW)

(72) Inventors: Yung-Chun Chuang, Taipei (TW); Huan-Chien Yang, New Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 245 days.

(21) Appl. No.: 17/567,129

(22) Filed: Jan. 2, 2022

(65) Prior Publication Data

US 2022/0231604 A1     Jul. 21, 2022

Related U.S. Application Data

(60) Provisional application No. 63/137,766, filed on Jan. 15, 2021.

(30) Foreign Application Priority Data

Jun. 17, 2021    (TW) .................................. 110122066

(51) Int. Cl.
  *H02M 3/158*   (2006.01)
  *H02M 3/156*   (2006.01)
  *H02M 1/00*    (2006.01)

(52) U.S. Cl.
  CPC ......... *H02M 3/158* (2013.01); *H02M 1/0025* (2021.05); *H02M 3/156* (2013.01); *H02M 3/1566* (2021.05)

(58) Field of Classification Search
  CPC .... H02M 1/0025; H02M 3/156; H02M 3/158; H02M 3/1566
  See application file for complete search history.

(56) References Cited

U.S. PATENT DOCUMENTS

| | | | | |
|---|---|---|---|---|
| 9,467,044 | B2 * | 10/2016 | Chen | H02M 3/156 |
| 11,245,332 | B1 * | 2/2022 | Houston | H02M 3/1582 |
| 11,381,167 | B2 * | 7/2022 | Munroe | H02M 3/158 |
| 2020/0266707 | A1 * | 8/2020 | Kong | H02M 3/158 |
| 2023/0238883 | A1 * | 7/2023 | Hsieh | H02M 1/0025 |
| | | | | 323/282 |

* cited by examiner

*Primary Examiner* — Kyle J Moody
*Assistant Examiner* — Jye-June Lee
(74) *Attorney, Agent, or Firm* — Tung & Associates

(57) ABSTRACT

A switching regulator includes a power stage circuit and a controller circuit. The controller circuit includes a first amplification circuit, a second amplification circuit, a ramp signal generation circuit, and a comparator. The first amplification circuit generates an amplification signal according to a difference between a low-pass filtered signal and a feedback signal. The second amplification circuit generates an adjustment signal according to a difference between the feedback signal and a fast response signal. The comparator generates a pulse width modulation signal according to a difference between the amplification signal and a ramp signal to generate a switch control signal. The adjustment signal adaptively adjusts the amplification signal or the ramp signal. The low-pass filtered signal is related to a signal generated by filtering out higher frequency part of the reference signal, and the reference signal is related to a dynamic change of a target level of the output voltage.

31 Claims, 13 Drawing Sheets

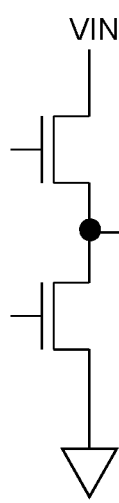
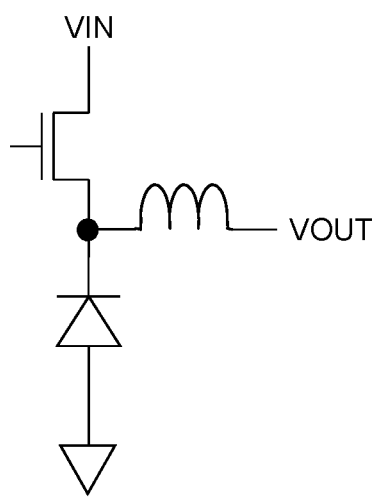
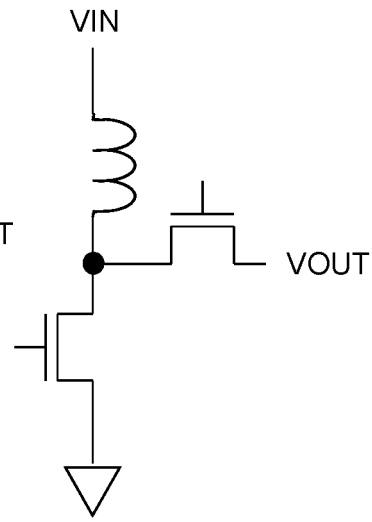
Fig. 9A         Fig. 9B         Fig. 9C
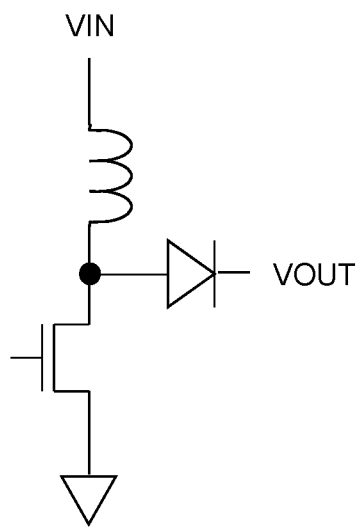
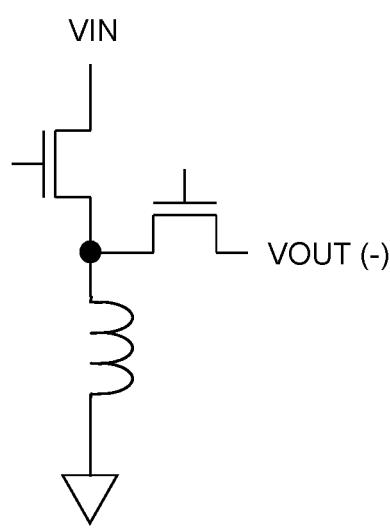
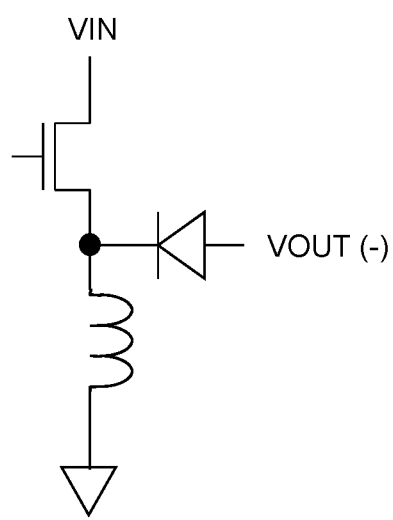
Fig. 9D         Fig. 9E         Fig. 9F

SWITCHING REGULATOR AND CONTROLLER CIRCUIT AND CONTROL METHOD THEREOF

CROSS REFERENCE

The present invention claims priority to U.S. 63/137,766 filed on Jan. 15, 2021 and claims priority to TW 110122066 filed on Jun. 17, 2021.

BACKGROUND OF THE INVENTION

Field of Invention

The present invention relates to a switching regulator; particularly, it relates to such switching regulator having improved dynamic voltage scaling (DVS) response. The present invention also relates to a controller circuit and a control method for use in such a switching regulator.

Description of Related Art

Please refer to FIG. 1A, which shows a schematic diagram of a conventional switching regulator 1. The switching regulator 1 includes: a power stage circuit 110 and a controller circuit 130. The power stage circuit 110 includes an inductor L and a power switch SW. The power switch SW is coupled to the inductor L, and operates to control a conduction status of the inductor L according to a switch control signal GATE, so as to convert an input voltage VIN to an output voltage VOUT. To control the conduction status of the inductor L means that, the power switch SW operates according to the switch control signal GATE to control the direction and amplitude of an inductor current iLX flowing through the inductor L.

The controller circuit 130 is coupled to the power stage circuit 110, and generates the switch control signal GATE according to a feedback signal VFB, a reference signal VREF, and a clock signal CLK, wherein the feedback signal VFB is related to the output voltage VOUT.

FIG. 1B shows a schematic diagram of the controller circuit 130 of the switching regulator 1. As shown in FIG. 1B, the controller circuit 130 includes an amplification circuit 131, a ramp signal generation circuit 133, and a comparator 134. The amplification circuit 131 includes a transconductance amplifier 1311 and a compensation circuit 1313. The transconductance amplifier 1311 generates a transconductance current Ieao according to a difference between the reference signal VREF and the feedback signal VFB. The transconductance current Ieao flows through a resistor and charges/discharges a capacitor in the compensation circuit 1313, whereby the compensation circuit 1313 generates an amplification signal aEAO accordingly. As shown in FIG. 1B, a mathematical relation among the transconductance current Ieao, the transconductance GM of the transconductance amplifier 1311, the reference signal VREF, and the feedback signal VFB can be expressed below:

$$Ieao=GM*(VREF-VFB)$$

The transconductance current Ieao charges/discharges the capacitor of the compensation circuit 1313, to generate a capacitor voltage aEAC, and the amplification signal aEAO is decided by the resistor of the compensation circuit 1313. The ramp signal generation circuit 133 generates a ramp signal xRAMP according to the clock signal CLK. The comparator 134 compares the amplification signal aEAO with the ramp signal xRAMP to generate a pulse width modulation (PWM) signal P1. As thus, the controller circuit 130 generates the switch control signal GATE according to the PWM signal P1.

FIG. 1C shows a schematic diagram of signal waveforms of the reference signal VREF and the feedback signal VFB of the prior art switching regulator 1. FIG. 1D shows a schematic diagram of signal waveforms of the ramp signal xRAMP, the amplification signal aEAO, and the capacitor voltage aEAC of the prior art switching regulator 1. FIG. 1E shows a schematic diagram of a signal waveform of the inductor current iLX of the prior art switching regulator 1.

The prior art switching regulator 1 has the following drawback. When a target level of the output voltage VOUT is changed, an overshoot or an undershoot of the output voltage VOUT occurs. For example, referring to FIG. 1C, when the reference signal VREF changes from 0.125V to 1.125V, it indicates that the target level of the output voltage VOUT is changed from a lower level to a higher level. An overshoot (or an undershoot in other cases) of the output voltage VOUT occurs during the transient process wherein the controller circuit 130 is feedback controlling according to the change of the target level of the output voltage VOUT, and if the overshoot or undershoot issue is to be mitigated, the response time of dynamic voltage scaling (DVS) may be too long. There is trade-off between the seriousness of overshoot (or undershoot) and the DVS response time and often there is no good solution.

In view of the above, to overcome the drawback in the prior art, the present invention proposes a switching regulator capable of improving dynamic voltage scaling (DVS) response. The present invention also proposes a controller circuit and a control method for use in such switching regulator.

SUMMARY OF THE INVENTION

From one perspective, the present invention provides a switching regulator, comprising: a power stage circuit, which includes an inductor and at least one power switch; wherein the power switch is coupled to the inductor, and is configure to operate according to a switch control signal, to control a conduction status of the inductor, so as to convert an input voltage to an output voltage; and a controller circuit, which is coupled to the power stage circuit, and is configured to operably generate the switch control signal according to a feedback signal and a reference signal, wherein the feedback signal is related to the output voltage and the reference signal is related to a dynamic change of a target level of the output voltage, wherein the controller circuit includes: a first amplification circuit, which is configured to operably generate an amplification signal according to a difference between a low-pass filtered signal and the feedback signal, wherein the low-pass filtered signal is related to a signal generated by low-pass filtering the reference signal based on a first predetermined bandwidth; a second amplification circuit, which is configured to operably generate an adjustment signal according to a difference between the feedback signal and a fast response signal; a ramp signal generation circuit, which is configured to operably generate a ramp signal according to a clock signal; and a comparator, which is configured to operably compare the amplification signal and the ramp signal, to generate a pulse width modulation (PWM) signal, wherein the controller circuit generates the switch control signal according to the PWM signal; wherein the adjustment signal is configured to operably adaptively adjust the amplification signal or the ramp signal, so as to reduce a response time and/or to mitigate or avoid an overshoot or an undershoot of the output voltage; wherein a voltage level of the fast response signal is between a voltage level of the low-pass filtered signal and a voltage level of the reference signal.

From another perspective, the present invention provides a controller circuit for use in a switching regulator, wherein the switching regulator includes a power stage circuit and the controller circuit, the power stage circuit including an inductor and at least one power switch, wherein the power switch is coupled to the inductor, and is configure to operate according to a switch control signal, to control a conduction status of the inductor, so as to convert an input voltage to an output voltage; wherein the controller circuit is coupled to the power stage circuit, and is configured to operably generate the switch control signal according to a feedback signal and a reference signal, wherein the feedback signal related to the output voltage and the reference signal is related to a dynamic change of a target level of the output voltage, the controller circuit comprising: a first amplification circuit, which is configured to operably generate an amplification signal according to a difference between a low-pass filtered signal and the feedback signal, wherein the low-pass filtered signal is related to a signal generated by low-pass filtering the reference signal based on a first predetermined bandwidth; a second amplification circuit, which is configured to operably generate an adjustment signal according to a difference between the feedback signal and a fast response signal; a ramp signal generation circuit, which is configured to operably generate a ramp signal according to a clock signal; and a comparator, which is configured to operably compare the amplification signal and the ramp signal, to generate a pulse width modulation (PWM) signal, wherein the controller circuit generates the switch control signal according to the PWM signal; wherein the adjustment signal is configured to operably adaptively adjust the amplification signal or the ramp signal, to reduce a response time and/or to mitigate or avoid an overshoot or an undershoot of the output voltage; wherein a voltage level of the fast response signal is between a voltage level of the low-pass filtered signal and a voltage level of the reference signal.

From another perspective, the present invention provides a control method for controlling a switching regulator, comprising: operating a power switch according to a switch control signal, to control a conduction status of an inductor, so as to convert an input voltage to an output voltage; generating an amplification signal according to a difference between a low-pass filtered signal and a feedback signal, wherein the feedback signal related to the output voltage and wherein the low-pass filtered signal is related to a signal generated by low-pass filtering the reference signal based on a first predetermined bandwidth, and wherein the reference signal is related to dynamic change of a target level of the output voltage; generating an adjustment signal according to a difference between the feedback signal and a fast response signal; generating a ramp signal according to a clock signal; and comparing the amplification signal and the ramp signal, to generate a pulse width modulation (PWM) signal, so as to generate the switch control signal according to the PWM signal; wherein the adjustment signal is configured to operably adaptively adjust the amplification signal or the ramp signal, to reduce a response time and/or to mitigate or avoid an overshoot or an undershoot of the output voltage; wherein a voltage level of the fast response signal is between a voltage level of the low-pass filtered signal and a voltage level of the reference signal.

In one preferred embodiment, the controller circuit further includes a first low-pass filter, which is configured to operably generate the low-pass filtered signal by low-pass filtering the reference signal based on the first predetermined bandwidth.

In one preferred embodiment, the controller circuit further includes a fast response signal generation circuit, which is configured to operably perform a linear weighting operation on the low-pass filtered signal and the reference signal to generate the fast response signal.

In one preferred embodiment, the fast response signal generation circuit obtains an average of the low-pass filtered signal and the reference signal as the fast response signal.

In one preferred embodiment, the controller circuit further includes a second low-pass filter, which is configured to operably generate the fast response signal by low-pass filtering the reference signal based on a second predetermined bandwidth; wherein the second predetermined bandwidth is larger than the first predetermined bandwidth.

In one preferred embodiment, the clock signal has a fixed frequency or a frequency correlated to an inductor current flowing through the inductor.

In one preferred embodiment, the controller circuit further includes a dynamic voltage regulation circuit, wherein the dynamic voltage regulation circuit changes the target level of the output voltage according to a request signal, so as to generate the reference signal and the low-pass filtered signal, to dynamically regulate the output voltage.

In one preferred embodiment, the first amplification circuit includes: a transconductance amplifier, which is configured to operably generate a transconductance current according to a difference between the reference signal and the feedback signal, or a difference between the low-pass filtered signal and the feedback signal; and a compensation circuit, which is coupled to the transconductance amplifier, and is configured to operably generate the amplification signal according to the transconductance current which charges/discharges a capacitor in the compensation circuit.

In one preferred embodiment, the adjustment signal is configured to adaptively adjust the ramp signal so as to adaptively adjust a conduction time and/or a duty of the pulse width modulation signal.

In one preferred embodiment, when the target level changes from a relatively lower first target level to a relatively higher second target level, and the feedback signal is lower than the fast response signal, the amplification signal increases, and the second amplification circuit sinks current to decrease a slope of the ramp signal, so as to extend a conduction time of the power switch; and wherein when the feedback signal is higher than the fast response signal, the amplification signal decreases, to increase the slope of the ramp signal, so as to decrease an increase rate of the output voltage, for mitigating or avoiding an overshoot of the output voltage.

In one preferred embodiment, when the target level changes from a relatively higher first target level to a relatively lower second target level, and the feedback signal is higher than the fast response signal, the amplification signal decreases, and the second amplification circuit sources current to increase a slope of the ramp signal, so as to extend a non-conduction time of the power switch; and wherein when the feedback signal is lower than the fast response signal, the amplification signal increases, to decrease the slope of the ramp signal, and the power switch is turned ON, so as to decrease a decrease rate of the output voltage, for mitigating or avoiding an undershoot of the output voltage.

BRIEF DESCRIPTION OF THE DRAWINGS

FIGS. 9A-9K show synchronous and asynchronous buck, boost, inverting, buck-boost, inverting-boost, and flyback power stage circuits respectively.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
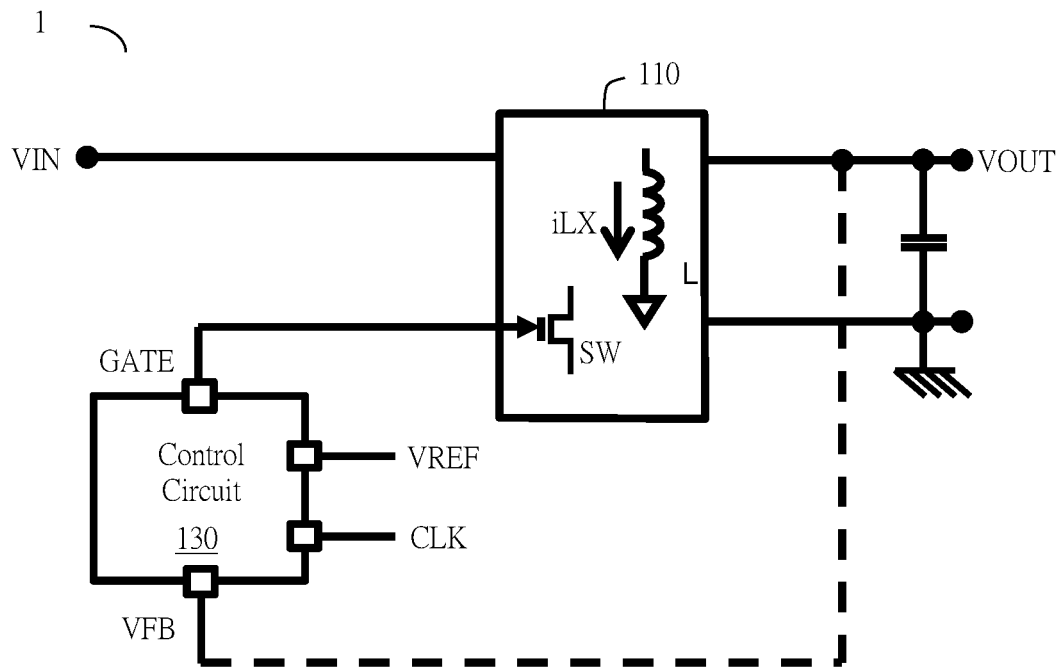
FIG. 1A shows a schematic block diagram of a conventional switching regulator 1.
Figure 1B:
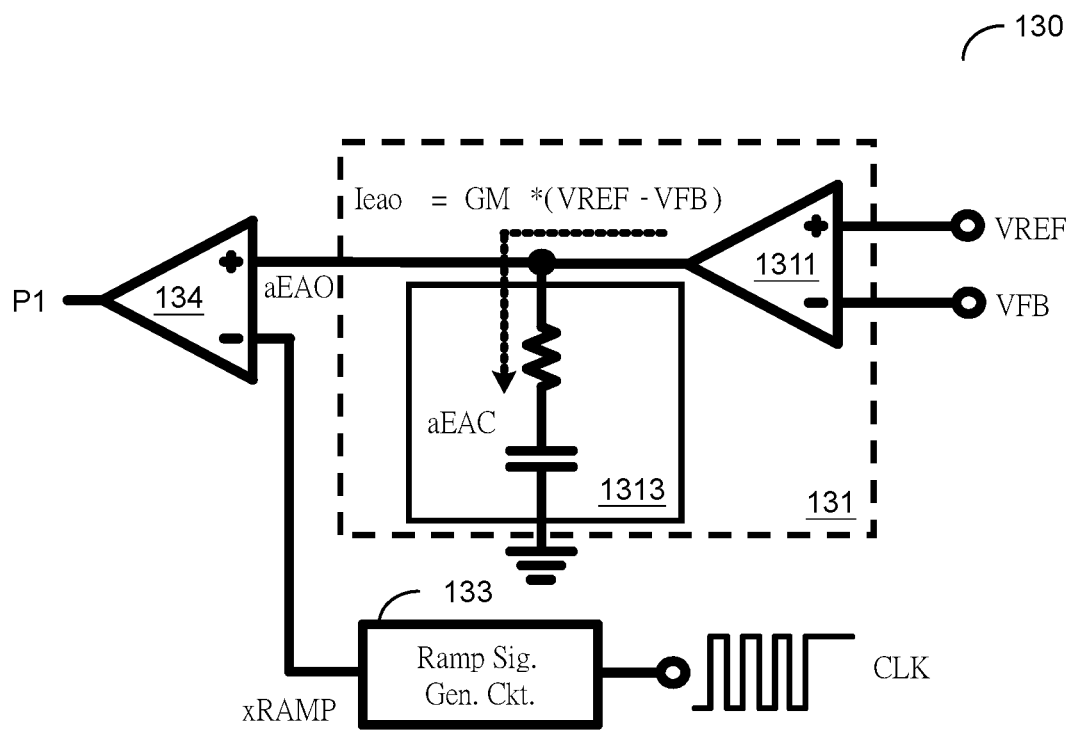
FIG. 1B shows a schematic block diagram of a controller circuit 30 of the conventional switching regulator 1.
Figure 1C:
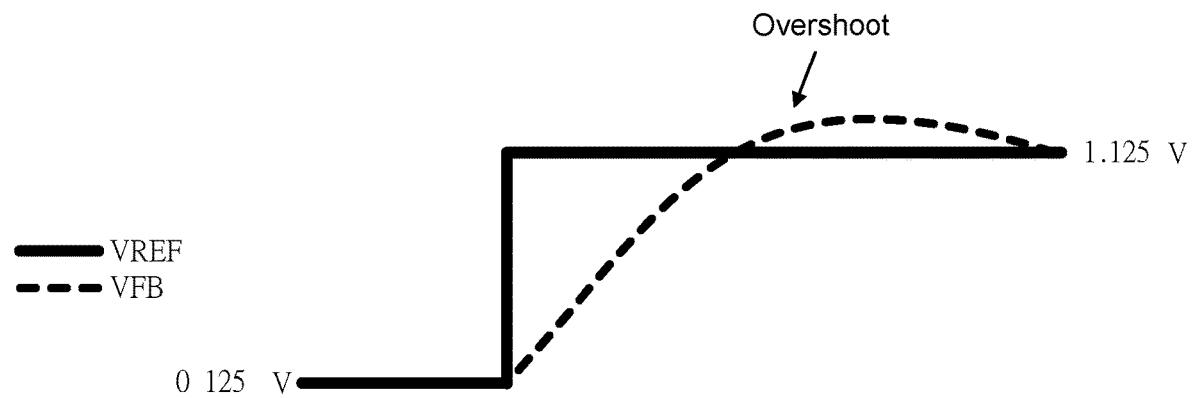
FIG. 1C illustrates waveforms of a reference signal VREF and a feedback signal VFB of the conventional switching regulator 1.
Figure 1D:
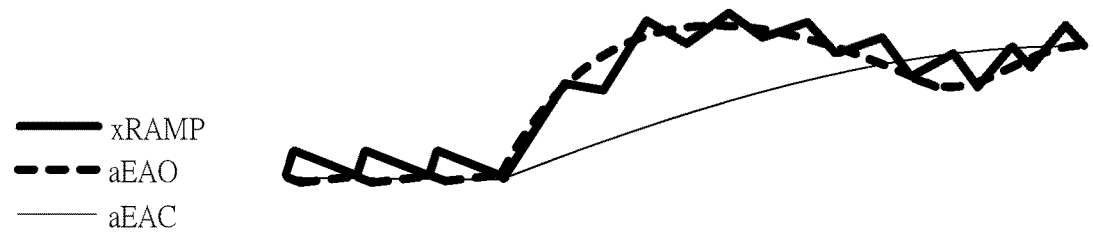
FIG. 1D illustrates waveforms of a ramp signal xRAMP, an amplification signal aEAO, and a capacitor voltage aEAC of the conventional switching regulator 1.
Figure 1E:
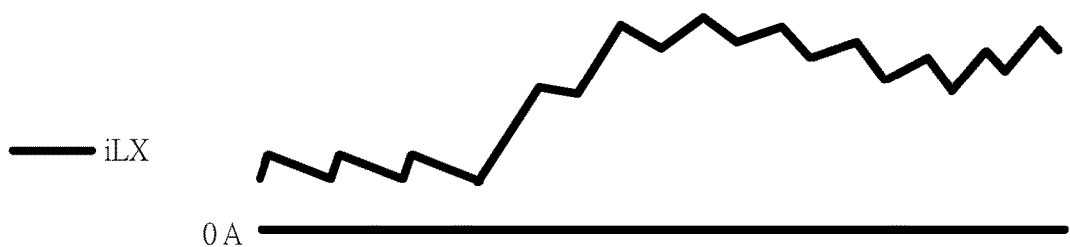
FIG. 1E illustrates a waveform of an inductor current iLX of the conventional switching regulator 1.
Figure 2A:
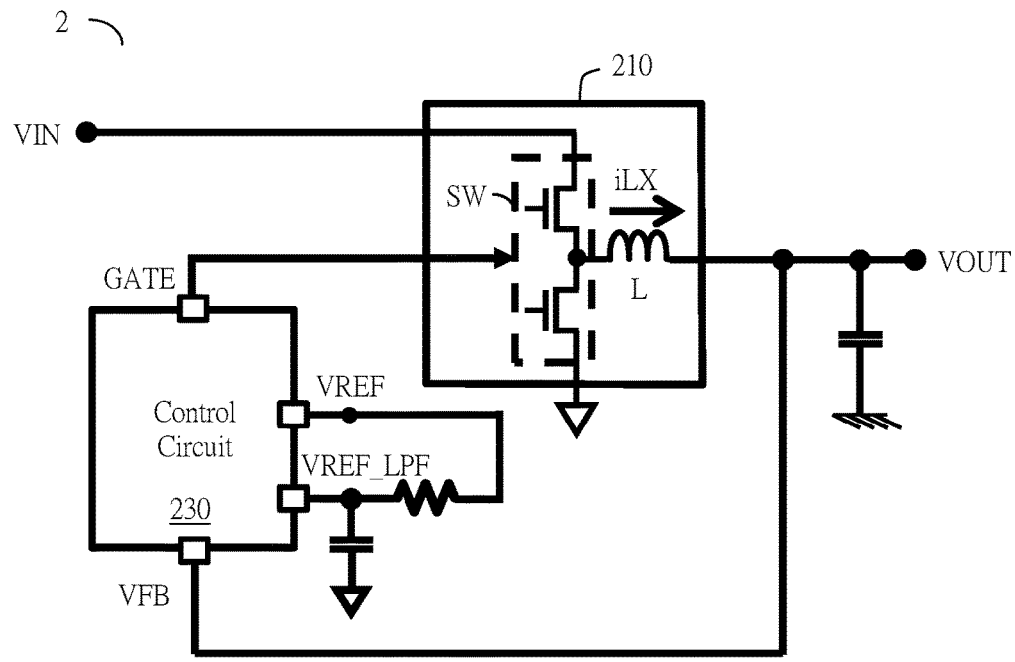
FIG. 2A shows a schematic block diagram of a switching regulator 2 according to an embodiment of the present invention.

Please refer to FIG. 2A, which shows a schematic block diagram of a switching regulator 2 according to an embodiment of the present invention. The switching regulator 2 comprises: a power stage circuits 210 and a controller circuit 230. The power stage circuit 210 includes an inductor L and a power switch SW. The power switch SW is coupled to the inductor L, and is configured to operably operate according to a switch control signal GATE, to control a conduction status of the inductor L, so as to convert an input voltage VIN to an output voltage VOUT. To control the conduction status of the inductor L means that the power switch SW operates according to the switch control signal GATE, to control the direction and amplitude of an inductor current iLX flowing through the inductor L.

The power stage circuit 210 is for example but not limited to a buck power stage circuit as shown in FIG. 2A. In other embodiments, the power stage circuit 210 may be synchronous and asynchronous buck, boost, inverting, buck-boost, inverting-boost, and flyback power stage circuits as shown in FIGS. 9A-9K respectively.

The controller circuit 230 is coupled to the power stage circuit 210, and is configured to operably generate the switch control signal GATE according to a feedback signal VFB and a reference signal VREF, wherein the feedback signal VFB is related to the output voltage VOUT and the reference signal VREF is related to dynamic change of a target level of the output voltage VOUT.

Figure 2B:
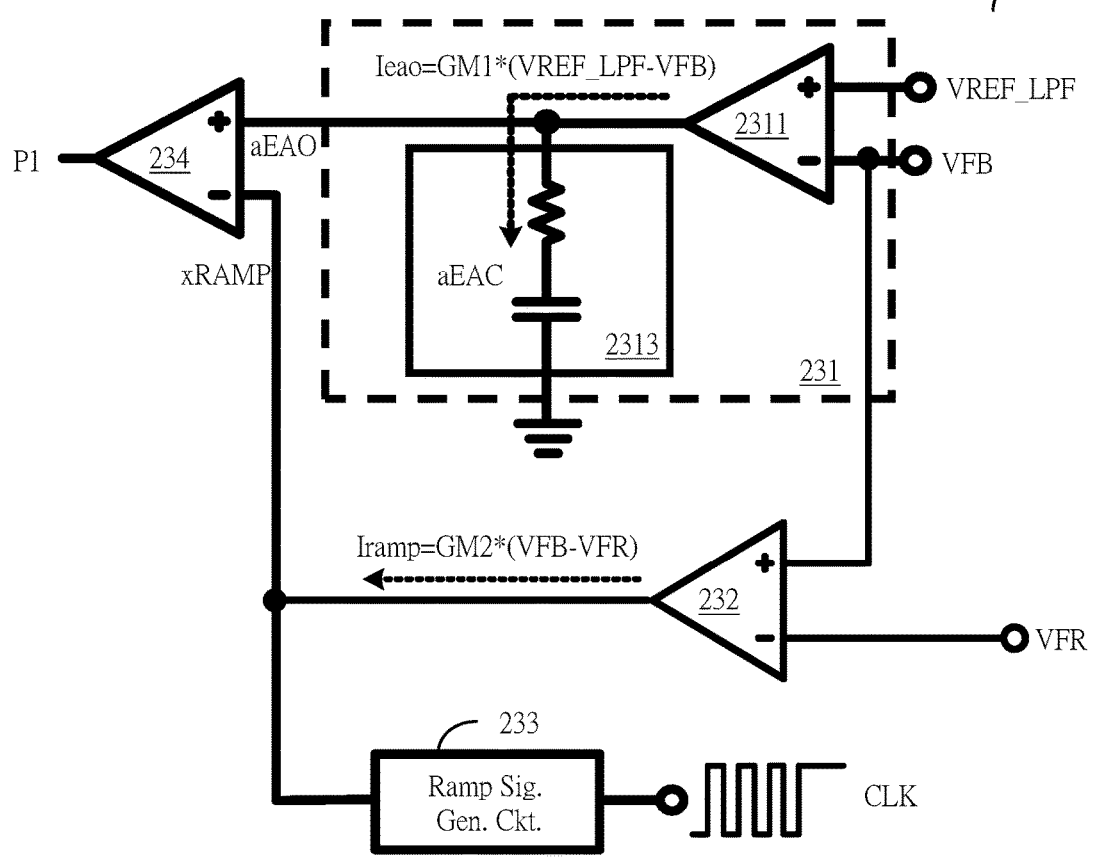
FIG. 2B shows a schematic block diagram of a controller circuit 230 of the switching regulator 2 according to an embodiment of the present invention.

FIG. 2B shows a schematic block diagram of a controller circuit 230 of the switching regulator 2 according to an embodiment of the present invention. As shown in FIG. 2B, the controller circuit 230 includes first amplification circuit 231, a second amplification circuit 232, a ramp signal generation circuit 233, and a comparator 234. In this embodiment, the first amplification circuit 231 is configured to operably generate an amplification signal aEAO according to a difference between a low-pass filtered signal VREF_LPF and the feedback signal VFB, wherein the low-pass filtered signal VREF_LPF is related to a signal generated by low-pass filtering the reference signal VREF based on a first predetermined bandwidth. The first predetermined bandwidth may be adjusted as needed. To filter out the relatively higher bandwidth part of the reference signal VREF and retaining the relatively lower bandwidth part of the reference signal VREF to generate the low-pass filtered signal VREF_LPF, provides effects of mitigating the overshoot or undershoot issue of the output voltage VOUT and improving the dynamic voltage scaling (DVS) response. To determine the first predetermined bandwidth, note that if the first predetermined bandwidth is wider, the relatively higher bandwidth part of the reference signal VREF that is filtered out is less, and the low-pass filtered signal VREF_LPF will be closer to the reference signal VREF, while if the first predetermined bandwidth is narrower, the relatively higher bandwidth part of the reference signal VREF that is filtered out is more, and the low-pass filtered signal VREF_LPF will be less closer to the reference signal VREF; a circuit designer can determine the first predetermined bandwidth accordingly.

In this embodiment, the amplification circuit 231 includes a transconductance amplifier 2311 and a compensation circuit 2313. The transconductance amplifier 2311 generates a transconductance current Ieao according to a difference between the low-pass filtered signal VREF_LPF and the feedback signal VFB. The compensation circuit 2313 is coupled to the transconductance amplifier 2311. The transconductance current Ieao flows through a resistor and charges/discharges a capacitor in the compensation circuit 2313, whereby the compensation circuit 2313 generates the amplification signal aEAO accordingly. Note that the compensation circuit 2313 consisting of the resistor and the capacitor connected in series as shown in FIG. 2B is only an example, but not to limit the broadest scope of the present invention. In other embodiments, various configurations can be adopted according to the requirements of the circuitry of the switching regulator 2. As shown in FIG. 2B, the relationship among the transconductance current Ieao, a transconductance GM1 of the transconductance amplifier 2311, the low-pass filtered signal VREF_LPF, and the feedback signal VFB can be expressed as follows:

$$Ieao=GM1*(VREF\_LPF-VFB)$$

The transconductance current Ieao charges/discharges the capacitor of the compensation circuit 2313 to generate a capacitor voltage aEAC, and the amplification signal aEAO is decided by the capacitor voltage aEAC and the voltage of the resistor in the compensation circuit 2313.

The second amplification circuit 232 generates an adjustment signal according to a difference between the feedback signal VFB and a fast response signal VFR. In this embodiment, the second amplification circuit 232 for example is a transconductance amplifier, and the adjustment signal for example is a transconductance current Iramp. The fast response signal VFR has a level between a level of the low-pass filtered signal VREF_LPF and a level of the reference signal VREF.

The ramp signal generation circuit 233 generates a ramp signal xRAMP according to a clock signal CLK. The ramp signal generation circuit 233 can be embodied in various forms. In one embodiment, the ramp signal xRAMP may be generated by charging/discharging a capacitor in the ramp signal generation circuit 233. The comparator 234 is configured to operably compare the amplification signal aEAO with the ramp signal xRAMP, to generate a pulse width modulation (PWM) signal P1, whereby the controller circuit 230 generates the switch control signal GATE according to the PWM signal P1.

In one embodiment, the control circuit 230 can generate the switch control signal GATE by directly using the PWM signal P1 as the switch control signal GATE; in another embodiment, the PWM signal P1 can pass through a buffer to generate the switch control signal GATE. In this embodiment, the adjustment signal (transconductance current Iramp) adaptively adjusts the ramp signal xRAMP to improve the DVS response, so as to mitigate or avoid an overshoot or an undershoot of the output voltage VOUT.

As mentioned above, in this embodiment, the adjustment signal for example is the transconductance current Iramp, and the transconductance current Iramp adaptively adjusts the ramp signal xRAMP; while in another embodiment, the transconductance current Iramp may instead be used to adaptively adjust the amplification signal aEAO. When the control circuit 230 changes the target level of the output voltage VOUT, by properly controlling the adjustment signal, the output voltage VOUT can change faster (the voltage change is accelerated, so to speak) in an earlier period of the transient process for shortening the response time, while the output voltage VOUT can change slower (the voltage change is decelerated, so to speak) in a later period of the transient process for mitigating or avoiding an overshoot or an undershoot of the output voltage VOUT in a dynamic voltage scaling (DVS) period. The relationship among the transconductance current Iramp, a transconductance GM2 of the second amplification 232, the feedback signal VFB, and the fast response signal VFR can be expressed as follows:

$$Iramp=GM2*(VFB-VFR)$$

Figure 3A:
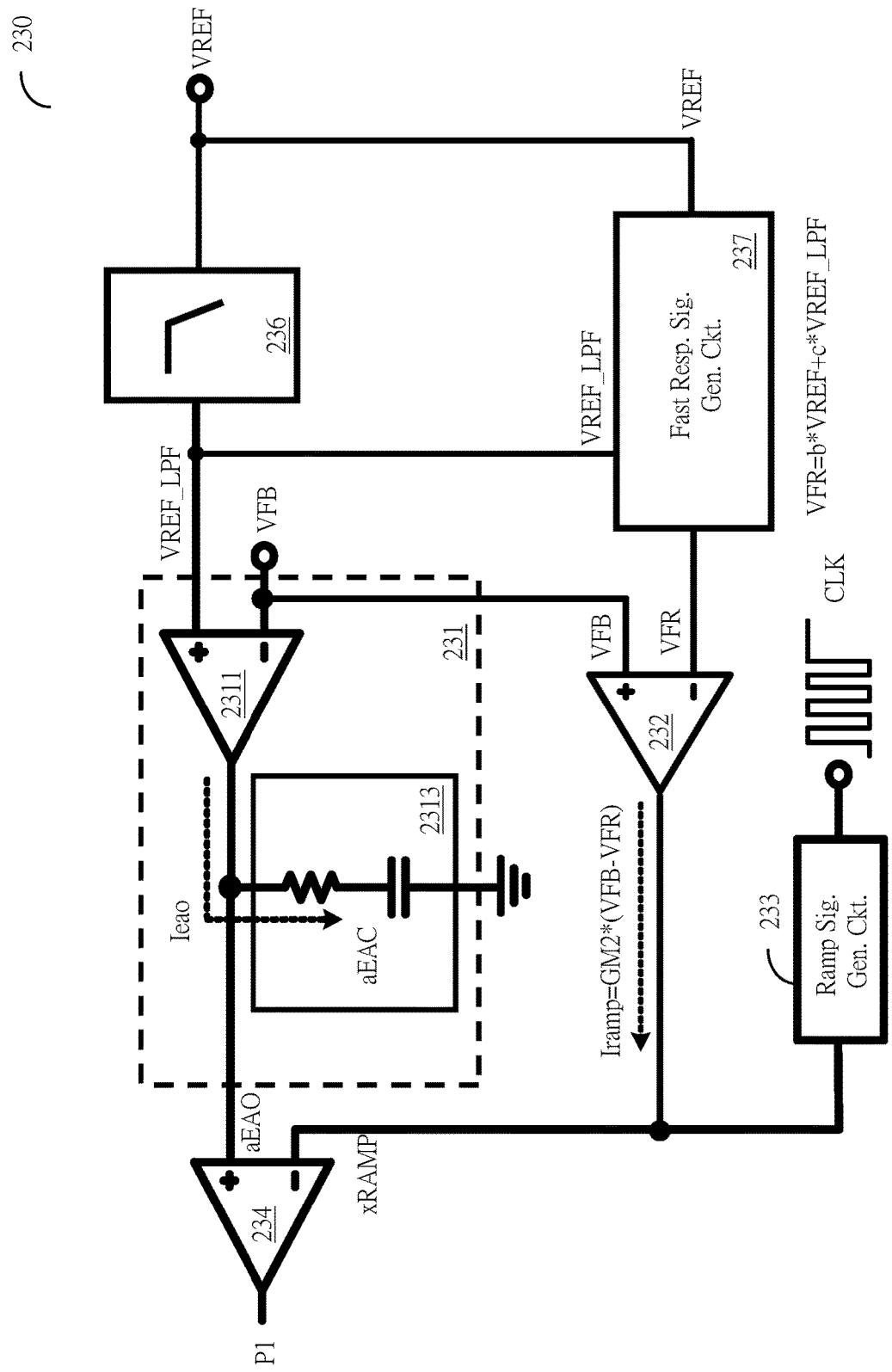
FIG. 3A shows a schematic diagram of the controller circuit 230 according to a specific embodiment of the present invention.

FIG. 3A shows a schematic diagram of the controller circuit 230 according to a specific embodiment of the present invention. This embodiment is different from the embodiment shown in FIG. 2B in that, in this embodiment, the control circuit 230 further includes a first low-pass filter 236 and a fast response signal generation circuit 237. The first low-pass filter 236 is configured to operably generate the low-pass filtered signal VREF_LPF by low-pass filtering the reference signal VREF to filter out relatively higher frequency part thereof based on the first predetermined bandwidth. The first low-pass filter 236 can be realized by circuitry which is well known to those skilled in this art and therefore it is not redundantly explained here.

The fast response signal generation circuit 237 is configured to operably perform a linear weighting operation on the low-pass filtered signal VREF_LPF and the reference signal VREF to generate the fast response signal VFR. In one embodiment, the relationship among the fast response signal VFR, the low-pass filtered signal VREF_LPF, and the reference signal VREF can be expressed as follows:

$$VFR=b*VREF+c*VREF\_LPF$$

In the above equation, the weightings b and c are real number indicating weighting adjustments of the reference signal VREF and the low-pass filtered signal VREF_LPF respectively. In one preferable embodiment, the weightings b and c are both 0.5, indicating that the fast response signal VFR is an average of the reference signal VREF and the low-pass filtered signal VREF_LPF.

Figure 3B:
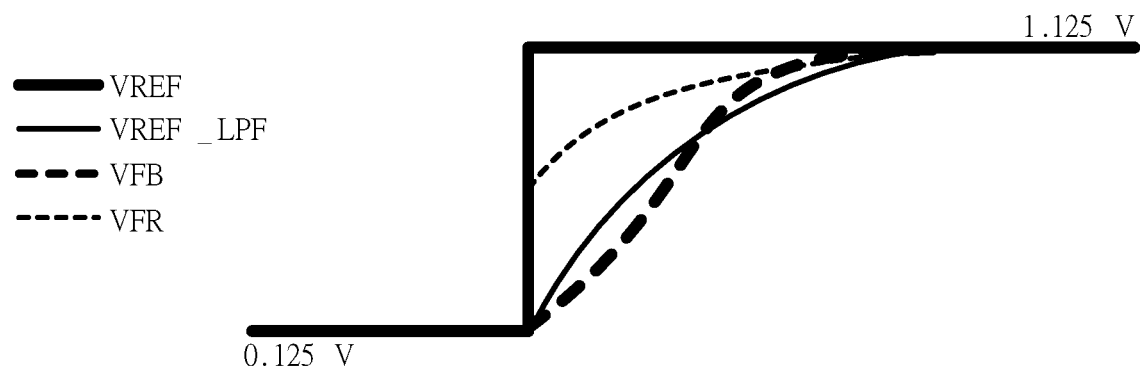
FIG. 3B illustrates waveforms of a reference signal VREF, a low-pass filtered signal VREF_LPF, a feedback signal VFB, and a quick response signal VFR of the embodiment shown in FIG. 3A.

FIG. 3B illustrates waveforms of the reference signal VREF, the low-pass filtered signal VREF_LPF, the feedback signal VFB, and the quick response signal VFR of the embodiment shown in FIG. 3A. As shown in FIG. 3B, in the embodiment shown in FIG. 3A, when the reference signal VREF changes from 0.125V to 1.125V, it indicates that a target level of the output voltage VOUT is changed from a lower level to a higher level. For example, the target level of the output voltage VOUT is changed from 0.5V to 4.5V. During a transition period (i.e. the DVS period) from when the output voltage VOUT being stably regulated at 0.5V to when the output voltage VOUT being stably regulated at 4.5V, the reference signal VREF and the low-pass filtered signal VREF_LPF are linearly weighted to generate the fast response signal VFR, wherein a voltage level of the fast response signal VFR is between a voltage level of the low-pass filtered signal VREF_LPF and a voltage level of the reference signal VREF.

As shown in FIG. 3B, in the DVS period, the feedback signal VFB is lower than the fast response signal VFR almost all the time; besides, the transconductance current Iramp is negative almost during all the DVS period, which indicates that the transconductance current Iramp flows back to the second amplification circuit 232; as thus, a slope of the ramp signal xRamp is decreased, and a duty ratio of the PWM signal P1 is increased.

Figure 4A:
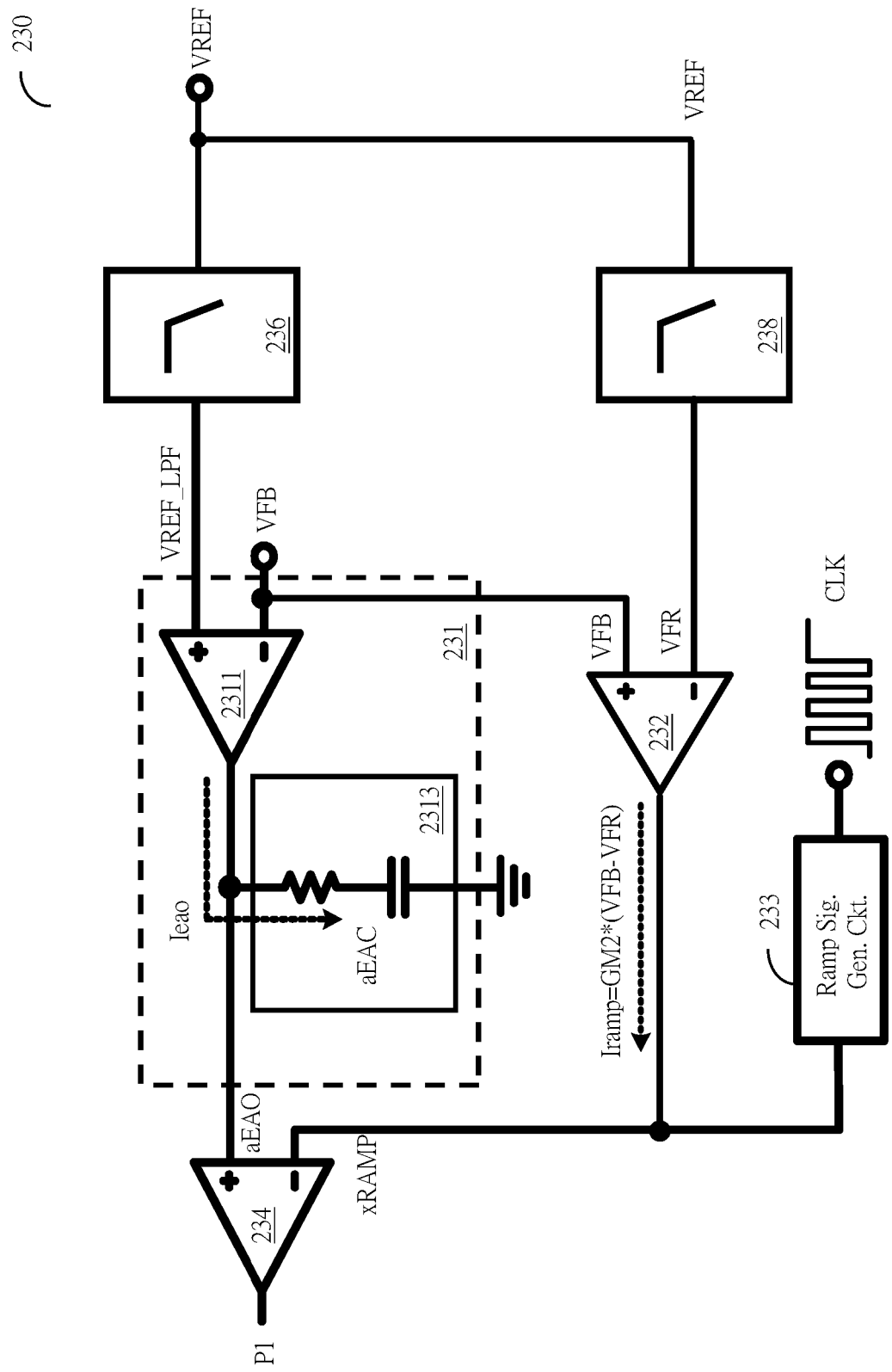
FIG. 4A shows a schematic diagram of the controller circuit 230 according to another embodiment of the present invention.

FIG. 4A shows another embodiment of the controller circuit 230 according to the present invention. This embodiment is different from the embodiment shown in FIG. 2B in that, this embodiment further includes a first low-pass filter 236 and a second low-pass filter 238. The first low-pass filter 236 is configured to operably generate the low-pass filtered signal VREF_LPF by low-pass filtering the reference signal VREF to filter out relatively higher frequency part thereof based on the first predetermined bandwidth. The first low-pass filter 236 can be realized by circuitry which is well known to those skilled in this art and therefore it is not redundantly explained here.

The second low-pass filter 238 is configured to operably generate the fast response signal VFR by low-pass filtering the reference signal VREF to filter out relatively higher frequency part thereof based on a second predetermined bandwidth, wherein the second predetermined bandwidth is higher than the first predetermined bandwidth. The second low-pass filter 238 can be realized by circuitry which is well known to those skilled in this art and therefore it is not redundantly explained here.

Figure 4B:
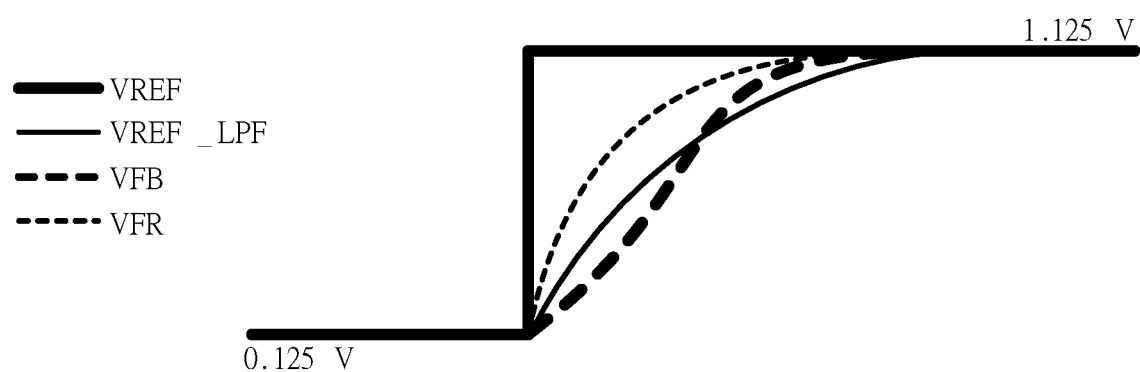
FIG. 4B illustrates waveforms of a reference signal VREF, a low-pass filtered signal VrEF_LPF, a feedback signal VFB, and a quick response signal VFR of the embodiment shown in FIG. 4A.

FIG. 4B illustrates waveforms of the reference signal VREF, the low-pass filtered signal VrEF_LPF, the feedback signal VFB, and the quick response signal VFR of the embodiment shown in FIG. 4A. As shown in FIG. 4B, in the embodiment shown in FIG. 3A, when the reference signal VREF changes from 0.125V to 1.125V, it indicates that a target level of the output voltage VOUT is changed from a lower level to a higher level. For example, the target level of the output voltage VOUT is changed from 0.5V to 4.5V. During a transition period (i.e. the DVS period) from when the output voltage VOUT being stably regulated at 0.5V to when the output voltage VOUT being stably regulated at 4.5V, relatively higher frequency part of the reference signal VREF is filtered out, to generate the fast response signal VFR, wherein a bandwidth of the fast response signal VFR is higher than a bandwidth of the low-pass filtered signal VREF_LPF, and thus a voltage level of the fast response signal VFR is between a voltage level of the low-pass filtered signal VREF_LPF and a voltage level of the reference signal VREF.

As shown in FIG. 4B, in the DVS period, the feedback signal VFB is lower than the fast response signal VFR almost all the time; besides, the transconductance current Iramp is negative almost during all the DVS period, which indicates that the transconductance current Iramp flows back to the second amplification circuit 232, as thus a slope of the ramp signal xRamp is decreased, and a duty ratio of the PWM signal P1 is increased.

Figure 5:
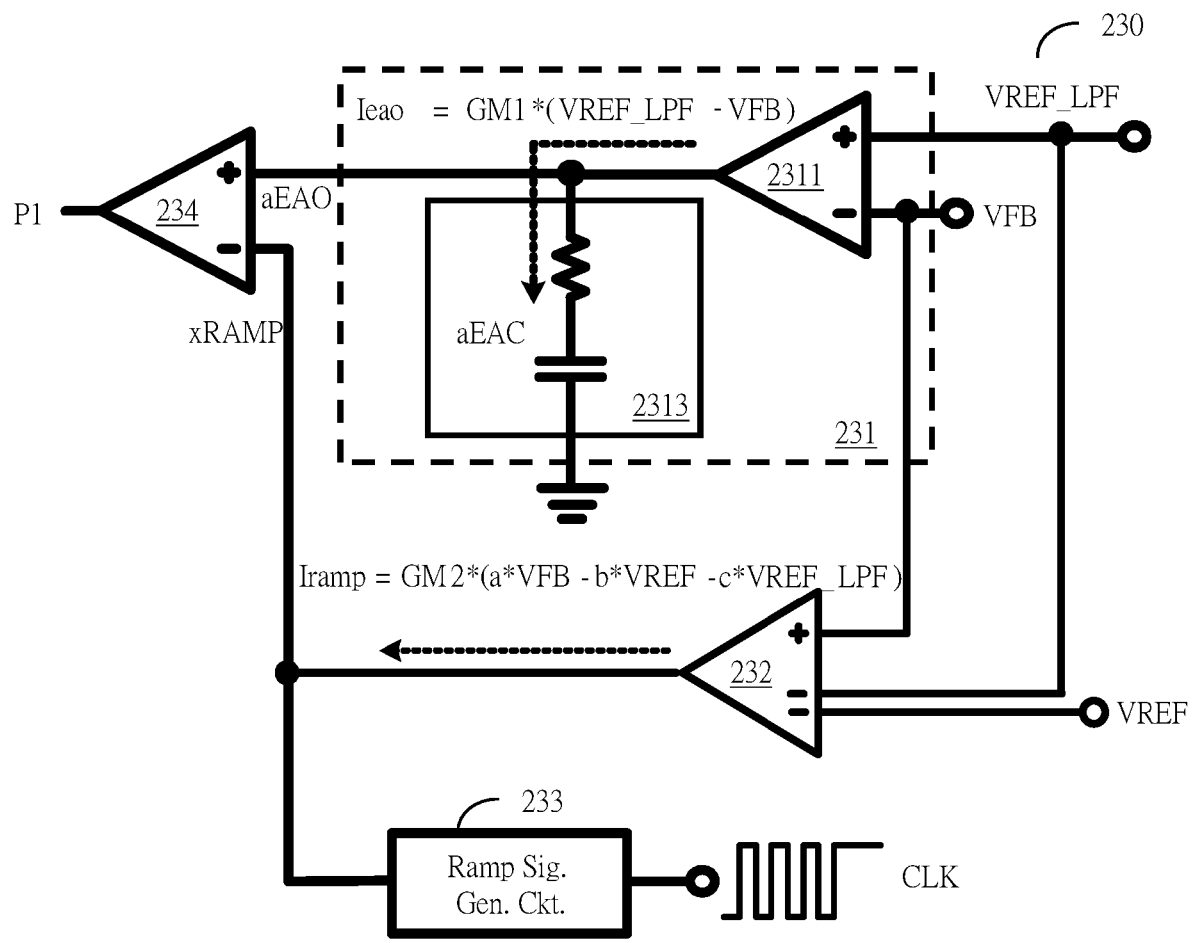
FIG. 5 shows a schematic diagram of the controller circuit 230 according to another embodiment of the present invention.

FIG. 5 shows another embodiment of the controller circuit 230 according to the present invention. This embodiment is different from the embodiment shown in FIG. 3A. As shown in FIG. 5, the second amplification circuit 232 generates the adjustment signal according to a difference which is a weighted feedback signal VFB having a weighting of a (i.e., a*VFB) minus a weighted reference signal VREF having a weighting of b (i.e., b*VREF), and further minus a weighted fast response signal VFR having a weighting of c (i.e., c*VFR). In this embodiment, the second amplification circuit 232 for example is an operational transconductance amplifier (OTA), and the adjustment signal for example is the transconductance current Iramp.

More specifically, the adjustment signal, in this embodiment the transconductance current Iramp, adaptively adjusts the ramp signal xRAMP; in another embodiment, the transconductance current Iramp may instead be used to adaptively adjust the amplification signal aEAO. When the control circuit 230 changes the target level of the output voltage VOUT, by properly controlling the adjustment signal, the output voltage VOUT can change faster (the voltage change is accelerated, so to speak) in an earlier period of the transient process for shortening the response time, while the output voltage VOUT can change slower (the voltage change is decelerated, so to speak) in a later period of the transient process for mitigating or avoiding an overshoot or an undershoot of the output voltage. The relationship among the transconductance current Iramp, the transconductance GM2 of the second amplification 232, the feedback signal VFB, the reference signal VREF, and the low-pass filtered signal VFB_LPF can be expressed as follows:

$$I_{ramp} = GM2*(a*VFB - b*VREF - c*VREF\_LPF)$$

In one preferable embodiment, the weighting ratio of the feedback signal VFB, the reference signal VREF, and the low-pass filtered signal VFB_LPF is 2:1:1. That is, the relationship among the transconductance current Iramp, the transconductance GM2 of the second amplification 232, the feedback signal VFB, the reference signal VREF, and the low-pass filtered signal VFB_LPF can be expressed as follows:

$$I_{ramp} = GM2*(2*VFB - VREF - VREF\_LPF)$$

As thus, this embodiment can provide an effect similar to that of the aforementioned embodiment wherein the fast response signal VFR is the average of the reference signal VREF and the low-pass filtered signal VREF_LPF.

Figure 6A:
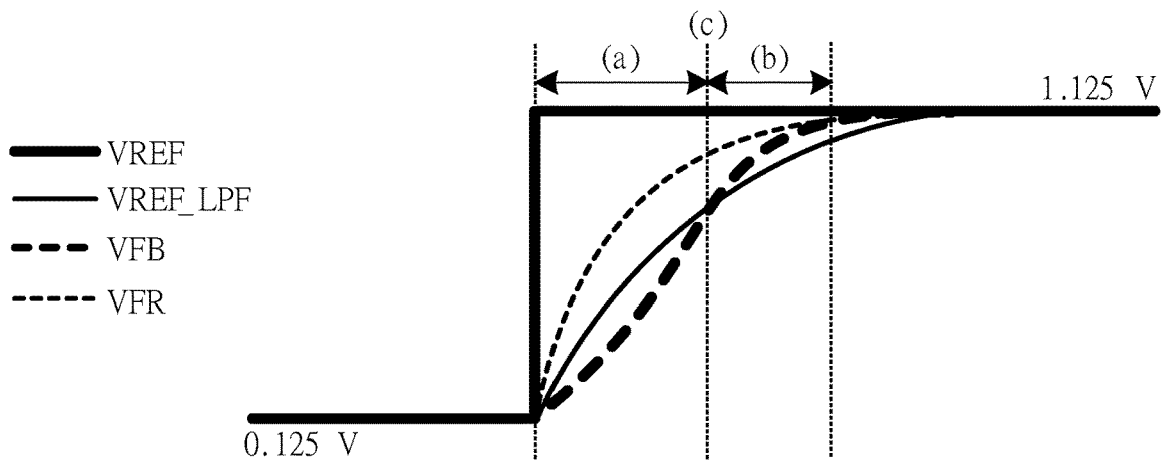
FIG. 6A illustrates waveforms of a reference signal VREF, a low-pass filtered signal VrEF_LPF, a feedback signal VFB, and a quick response signal VFR of one embodiment according to the present invention.
Figure 6B:
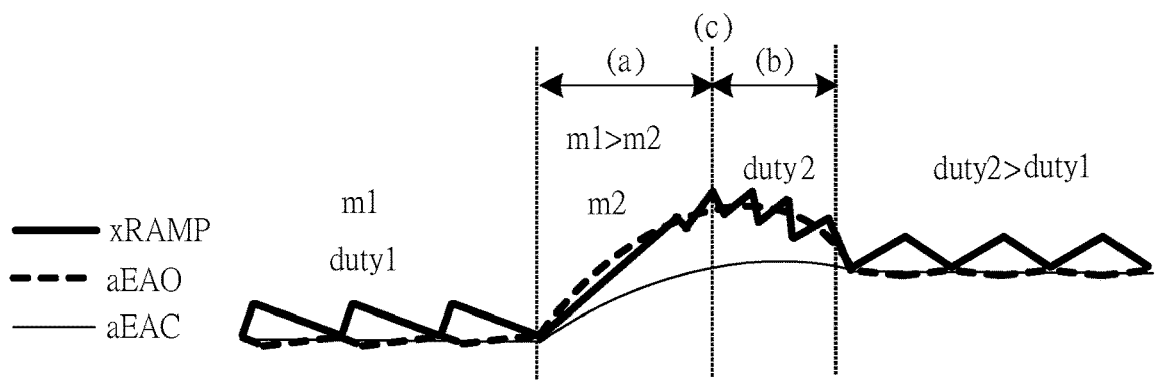
FIG. 6B illustrates waveforms of a ramp signal xRAMP, an amplification signal aEAO, and a capacitor voltage aEAC of one embodiment according to the present invention.
Figure 6C:
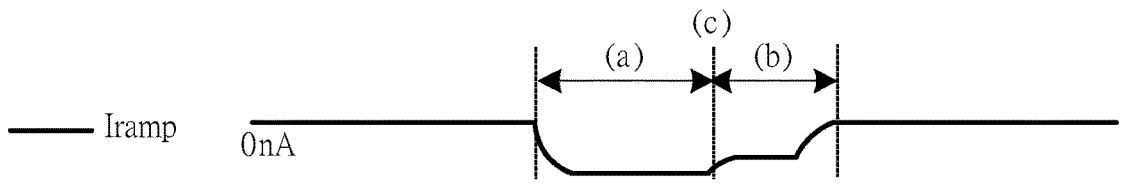
FIG. 6C illustrates a waveform of a transconductance current Iramp of one embodiment according to the present invention.
Figure 6D:
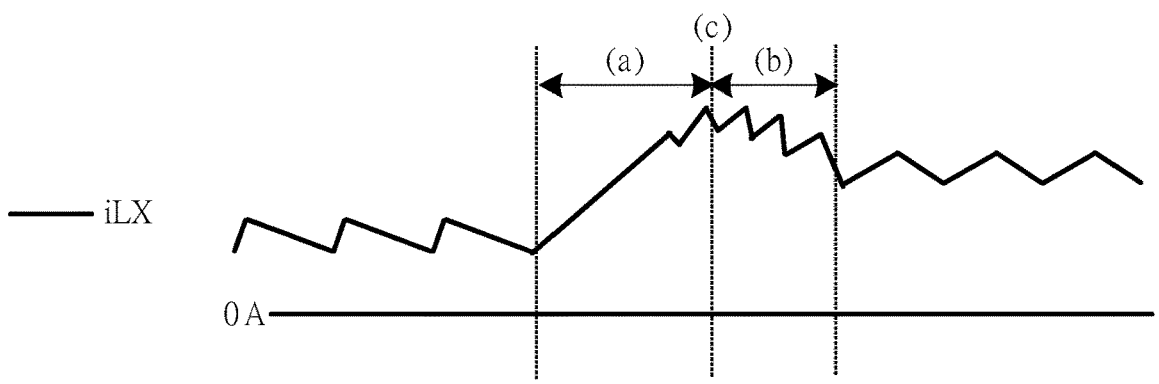
FIG. 6D illustrates a waveform of an inductor current iLX of one embodiment according to the present invention.

FIG. 6A illustrates waveforms of the reference signal VREF, the low-pass filtered signal VREF_LPF, the feedback signal VFB, and the quick response signal VFR of one embodiment according to the present invention. In this embodiment, the low-pass filtered signal VREF_LPF for example is generated by low-pass filtering the reference signal VREF to filter out relatively higher frequency part thereof based on the first predetermined bandwidth. The fast response signal VFR for example is generated by low-pass filtering the reference signal VREF to filter out relatively higher frequency part thereof based on the second predetermined bandwidth, wherein the second predetermined bandwidth is higher than the first predetermined bandwidth. As thus, the bandwidth of the fast response signal VFR is higher than the bandwidth of the low-pass filtered signal VREF_LPF, and therefore, the level of the fast response signal VFR is between the level of the low-pass filtered signal VREF_LPF and the level of the reference signal VREF. FIG. 6B illustrates waveforms of a ramp signal xRAMP, an amplification signal aEAO, and a capacitor voltage aEAC of one embodiment according to the present invention. FIG. 6C illustrates a waveform of a transconductance current Iramp of one embodiment according to the present invention. FIG. 6D illustrates a waveform of an inductor current iLX of one embodiment according to the present invention.

As shown in FIG. 6A, when the reference signal VREF changes from 0.125V to 1.125V, it indicates that the target level of the output voltage VOUT is changed from the lower level to the higher level. For example, the target level of the output voltage VOUT is changed from 0.5V to 4.5V. The transition period (i.e. the DVS period) from when the output voltage VOUT being stably regulated at 0.5V to when the output voltage VOUT being stably regulated at 4.5V for example is divided into two sub-periods, i.e. sub-period (a) and sub-period (b), and the sub-period (a) and sub-period (b) are separate by a time point (c). The time point (c) indicates a time point when the feedback signal VFB is equal to the low-pass filtered signal VREF_LPF. In this embodiment shown in FIG. 6A, the sub-period (a) indicates a time period wherein the feedback signal VFB is lower than the low-pass filtered signal VREF_LPF; the sub-period (b) indicates a time period wherein the feedback signal VFB is higher than the low-pass filtered signal VREF_LPF.

In the sub-period (a), a difference between a present level of the output voltage VOUT and the target level of the output voltage VOUT is relatively larger. In the sub-period (a), the switch control signal GATE is adaptively adjusted for example to extend the conduction time (ON time) of the power switch SW, so as to shorten a rising time of the output voltage VOUT, whereby a transient response time is shortened. In this embodiment, in the sub-period (a), the difference of the low-pass filtered signal VREF_LPF minus the feedback signal VFB is positive, and the transconductance amplifier 2311 generates the transconductance current Ieao to charge the capacitor in the compensation circuit 2313, to increase the amplification signal aEAO; besides, the feedback signal VFB is lower than the fast response signal VFR, and the transconductance current Iramp is negative, as thus the second amplifier circuit 232 (the transconductance amplifier) sinks current to generate the transconductance current Iramp in an opposite direction to that shown in FIG. 4A to reduce the slope of the ramp signal xRAMP, thereby increasing the duty ratio of the PWM signal P1, whereby the conduction time of the power switch SW is extended.

In the sub-period (b), a difference of a present level of the output voltage VOUT minus the target level of the output voltage VOUT is relatively smaller, but the output voltage VOUT needs to keep increasing. In the sub-period (b), the difference of the low-pass filtered signal VREF_LPF minus the feedback signal VFB is negative, and the transconductance amplifier 2311 generates the transconductance current Ieao to discharge the capacitor in the compensation circuit 2313, to decrease the amplification signal aEAO. In the sub-period (b), for example, the duty ratio of the PWM signal P1 (proportional to the switch control signal GATE) is adaptively adjusted to be higher than that of the PWM signal P1 in the case when the output voltage VOUT is stable, so as to keep increasing the output voltage VOUT. When the output voltage VOUT increases to an extent closer to the target level, an absolute value of the aforementioned transconductance current Iramp decreases (but still is negative, that is, as shown in FIG. 6C, the transconductance current Iramp keeps rising in the sub-period (b)), and the slope of the ramp signal xRAMP is adaptively increased, to decrease the difference between the amplification signal aEAO and the ramp signal xRAMP, so as to increase an operating frequency of the switch control signal GATE and/or reduce the duty ratio of the control signal GATE, thereby reducing the s rising peed of the output voltage VOUT to mitigate or avoid an overshoot of the output voltage VOUT.

One of the advantageous features of the present invention over the prior art is that, referring to FIGS. 2B and 6A-6D, when the target level of the output voltage VOUT changes, a fast response signal VFR having a level between the reference signal VREF and the low-pass filtered signal VREF_LPF is generated according to the reference signal VREF and the low-pass filter signal VREF_LPF. The fast response signal VFR indicates how the PWM signal P1 is compensated by the second amplification circuit 232. And the absolute value of the slope of the fast response signal VFR is positively correlated to the difference between the reference signal VREF and the low-pass filtered signal VREF_LPF. The level of the fast response signal VFR is between the level of the low-pass filtered signal VREF_LPF and the level of the reference signal VREF. During the DVS period, i.e., when the control circuit 230 changes the target level of the output voltage VOUT, the absolute value of the slope of the fast response signal VFR gradually decreases. The second amplification circuit 232 is configured according to the fast response signal VFR to adaptively compensate the ramp signal xRAMP.

The second amplification circuit 232 for example is a transconductance amplifier, which is capable of sourcing or sinking currents, to adaptively adjust the ramp signal xRAMP in a direction opposite to a status of the amplification signal aEAO. For example, when the amplification signal aEAO is relatively higher, the second amplification circuit 232 decreases the slope of the ramp signal xRAMP; and when the amplification signal aEAO is relatively lower, the second amplification circuit 232 increases the slope of the ramp signal xRAMP. Thus, by adaptively adjusting the ramp signal xRAMP by the second amplification circuit 232, the present invention can adaptively extend an ON time (conduction time) or an OFF time (non-conduction time) of the power switch SW to decrease the rising time or the falling time of the output voltage VOUT, so as to, on one hand, shorten the transient response time when the difference between the present level of the output voltage VOUT and the target level of the output voltage VOUT is relatively large, and on the other hand, increase the operation frequency of the switch control signal GATE to reduce the changing rate of the output voltage VOUT to avoid an overshoot or an undershoot of the output voltage VOUT when the difference between the present level of the output voltage VOUT and the target level of the output voltage VOUT is relatively small.

Referring to FIG. 6B, when the output voltage is regulated stably at the target level such as 0.5V, the ramp signal xRAMP has a rising slop m1 and a duty ratio duty1 in each switching period. The DVS period indicates a transition period from when the output voltage VOUT being stably regulated at 0.5V to when the output voltage VOUT being stably regulated at 4.5V. In the sub-period (a) of the DVS period, the ramp signal xRAMP has a rising slop m2, wherein the rising slop m1 is larger than the rising slope m2. As thus, in the sub-period (a), the conduction time of the power switch SW is extended to be longer than in the sub-period (b), to shorten the rising time of the output voltage VOUT, so as to shorten the transient response time.

Still referring to FIG. 6B, in the sub-period (b) of the DVS period, a rising slop of the ramp signal xRAMP is higher than that in the sub-period (a), but still smaller than the rising slope m1. The ramp signal xRAMP has a duty ratio duty2 (corresponding to the PWM signal P1), wherein the duty ratio duty2 is higher than the duty ratio duty1, which indicates that the output voltage VOUT is still increasing. That is, the switch control signal GATE is adaptively adjusted in the sub-period (b) by keeping the duty ratio duty2 higher than the duty ratio duty1 of the PWM signal P1 to keep increasing the output voltage VOUT, wherein the duty ratio duty1 is the duty ratio when the output voltage VOUT is stably regulated at the lower voltage (0.5V)

Referring to FIG. 6C, FIG. 6C illustrates a waveform of a transconductance current Iramp of one embodiment according to the present invention. When the output voltage is stably regulated at a target level, the transconductance current Iramp is zero current, and it indicates that the ramp signal xRAMP does not need to be adjusted. When the target level of the output voltage VOUT changes from a lower level to a higher level, the transconductance current Iramp gradually changes from zero current to a negative current (in the sub-period (a)), and then the transconductance current Iramp gradually changes from the negative current to a less negative current (in the sub-period (b)), and then the transconductance current Iramp gradually changes from the less negative current to the zero current (after the sub-period (b)); as thus the slope of the ramp signal xRAMP is dynamically adjusted. Referring to FIG. 6D, FIG. 6D illustrates a waveform of an inductor current iLX of one embodiment according to the present invention. In one preferable embodiment, a frequency of the clock signal CLK is a fixed frequency or a frequency related to the inductor current iLX flowing through the inductor L. In this embodiment, for example, the frequency of the inductor current iLX flowing through the inductor L is used as the frequency of the clock signal CLK.

Figure 7:
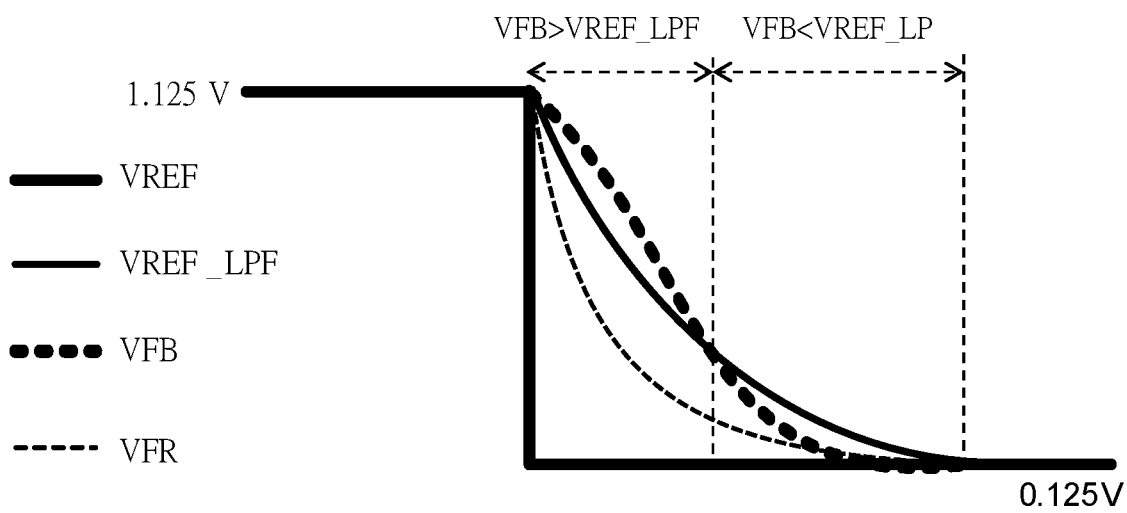
FIG. 7 illustrates waveforms of a reference signal VREF, a low-pass filtered signal VREF_LPF, a feedback signal VFB, and a quick response signal VFR of one embodiment according to the present invention.

FIG. 7 illustrates waveforms of a reference signal VREF, a low-pass filtered signal VREF_LPF, a feedback signal VFB, and a quick response signal VFR of one embodiment according to the present invention. In this embodiment, when the reference signal VREF changes from 1.125V to 0.125V, it indicates that the target level of the output voltage VOUT is changed from a higher level to a lower level. For example, the target level of the output voltage VOUT is changed from 4.5V to 0.5V. The period from when the output voltage VOUT being stably regulated at 4.5V to when the output voltage VOUT being stably regulated at 0.5V is for example divided into two sub-periods, and the two sub-periods are separate by a time point which indicates a time point when the feedback signal VFB is equal to the low-pass filtered signal VREF_LPF. In this embodiment shown in FIG. 7, the earlier sub-period indicates a period wherein the feedback signal VFB is higher than the low-pass filtered signal VREF_LPF; the later sub-period indicates a period wherein the feedback signal VFB is lower than the low-pass filtered signal VREF_LPF.

In the earlier sub-period, a difference between a present level of the output voltage VOUT and the target level of the output voltage VOUT is relatively larger. In the earlier sub-period, the switch control signal GATE is adaptively adjusted for example to extend the OFF time of the power switch SW, so as to shorten a falling time of the output voltage VOUT, whereby the transient response time is shortened. In this embodiment, in the earlier sub-period, the difference of the low-pass filtered signal VREF_LPF minus the feedback signal VFB is negative, and the transconductance amplifier 2311 generates the transconductance current Ieao to discharge the capacitor in the compensation circuit 2313, to decrease the amplification signal aEAO; besides, the feedback signal VFB is higher than the fast response signal VFR, and the transconductance current Iramp is positive, as thus the second amplifier circuit 232 (the transconductance amplifier) sources current to generate the transconductance current Iramp to increase the slope of the ramp signal xRAMP, thereby decreasing the duty ratio of the PWM signal P1, whereby the OFF time of the power switch SW is extended.

In the later sub-period, a difference between a present level of the output voltage VOUT and the target level of the output voltage VOUT is relatively smaller, but the output voltage VOUT needs to keep decreasing. In the later sub-period, the difference of the low-pass filtered signal VREF_LPF minus the feedback signal VFB is positive, and the transconductance amplifier 2311 generates the transconductance current Ieao to charge the capacitor in the compensation circuit 2313, to increase the amplification signal aEAO. In the later sub-period, for example, the duty ratio of the PWM signal P1 (proportional to the switch control signal GATE) is adaptively adjusted to increase, but maintained lower than that of the PWM signal P1 in the case when the output voltage VOUT stays stable, to keep decreasing the output voltage VOUT. When the output voltage VOUT decreases to an extent closer to the target level, the difference between the amplification signal aEAO and the ramp signal xRAMP is decreased, to increase an operating frequency of the switch control signal GATE, thereby reducing the decreasing rate of the output voltage VOUT to mitigate or avoid an undershoot of the output voltage VOUT.

Figure 8:
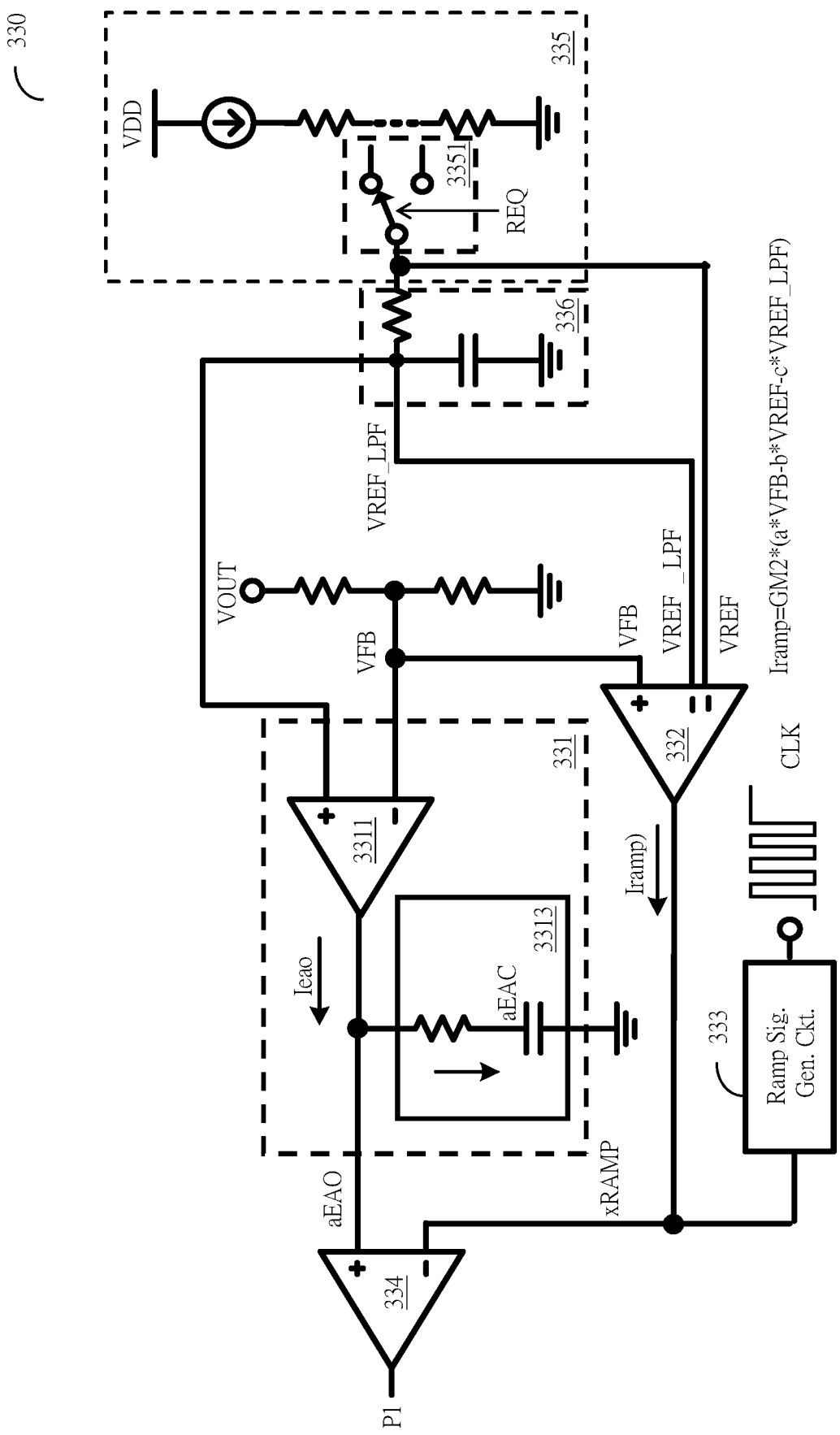
FIG. 8 shows a schematic diagram of the controller circuit 330 according to another embodiment of the present invention.
Figure 9G:
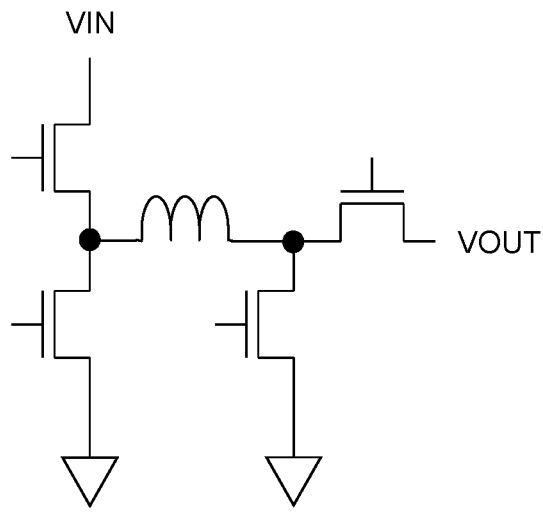
Figure 9H:
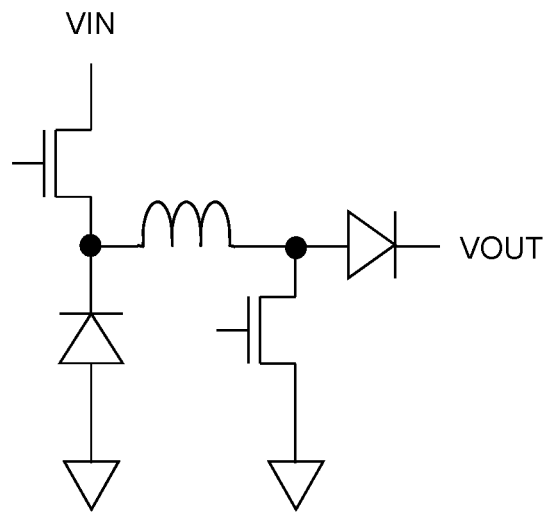
Figure 9I:
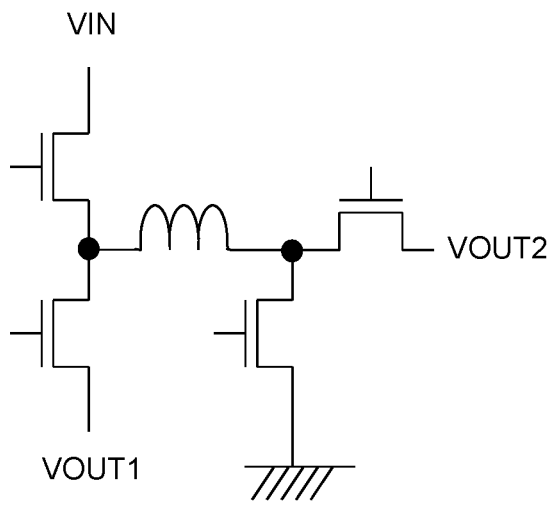
Figure 9J:
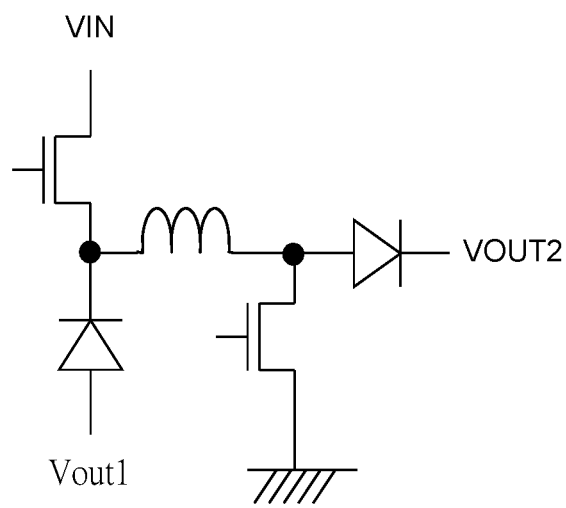
Figure 9K:
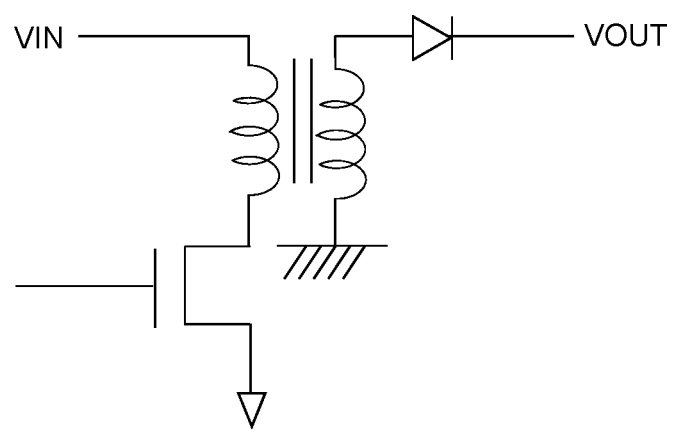

FIG. 8 shows a schematic diagram of the controller circuit 330 according to another embodiment of the present invention. As shown in FIG. 8, the controller circuit 330 includes first amplification circuit 331, a second amplification circuit 332, a ramp signal generation circuit 333, a comparator 334, and dynamic voltage scaling (DVS) circuit 335. In this embodiment, the first amplification circuit 331 is configured to operably generate the amplification signal aEAO according to the difference between a low-pass filtered signal VREF_LPF and a feedback signal VFB. In this embodiment, the amplification circuit 331 includes a transconductance amplifier 3311 and a compensation circuit 3313. The transconductance amplifier 3311 generates the transconductance current Ieao according to the difference between the low-pass filtered signal VREF_LPF and the feedback signal VFB. The transconductance current Ieao flows through a resistor and charges/discharges a capacitor in the compensation circuit 3313, whereby the compensation circuit 3313 generates the amplification signal aEAO accordingly.

In this embodiment, a linear weighting operation is performed on the low-pass filtered signal VREF_LPF and the reference signal VREF to generate the fast response signal VFR. The second amplification circuit 332 generates the adjustment signal according to a difference which is a weighted feedback signal VFB having a weighting of a (i.e., a*VFB) minus a weighted reference signal VREF having a weighting of b (i.e., b*VREF), and further minus a weighted fast response signal VFR having a weighting of c (i.e., c*VFR). That is, the second amplification circuit 332 generates the adjustment signal according to the difference between the weighted feedback signal VFB and a sum of the weighted reference signal VREF and the weighted low-pass filtered VFB_LPF. In this embodiment, the second amplification circuit 232 for example is an operational transconductance amplifier (OTA), and the adjustment signal for example is the transconductance current Iramp. The ramp signal generation circuit 333 generates a ramp signal xRAMP according to a clock signal CLK. The comparator 334 is configured to operably compare the amplification signal aEAO with the ramp signal xRAMP, to generate the pulse width modulation (PWM) signal P1, wherein the controller circuit 330 generates the switch control signal GATE according to the PWM signal P1.

This embodiment shows a more specific embodiment of the DVS circuit 335. As shown in FIG. 8, the DVS circuit 335 includes a current source, a plurality of resistors connected in series, and a selection switch 3351, wherein the current source and the plural resistors are electrically connected in series between an internal supply voltage VDD and a ground level. According to a request signal REQ, the selection switch 3351 switches to select a division voltage to be outputted at an output terminal of the selection switch, so as to generate the reference signal VREF to decide the target level of the output voltage. In one embodiment, a low-pass filter circuit 336 for example includes a resistor and a capacitor. The low-pass filter circuit 336 filters out the relatively higher frequency part of the reference signal VREF to generate the low-pass filtered signal VREF_LPF.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. For example, the DVS circuit shown in FIG. 7 may be used in FIGS. 2B and 4. For another example, the transconductance current Iram shown in FIG. 2B may be use to adjust the amplification signal aEAO. In view of the foregoing, the spirit of the present invention should cover all such and other modifications and variations, which should be interpreted to fall within the scope of the following claims and their equivalents.

What is claimed is:

1. A switching regulator, comprising:
   a power stage circuit, which includes an inductor and at least one power switch; wherein the at least one power switch is coupled to the inductor, and is configured to operate according to a switch control signal, to control a conduction status of the inductor, so as to convert an input voltage to an output voltage; and
   a controller circuit, which is coupled to the power stage circuit, and is configured to operably generate the switch control signal according to a feedback signal and a reference signal, wherein the feedback signal is related to the output voltage and the reference signal is related to a dynamic change of a target level of the output voltage, wherein the controller circuit includes:
     a first amplification circuit, which is configured to operably generate an amplification signal according to a difference between a low-pass filtered signal and the feedback signal, wherein the low-pass filtered signal is related to a signal generated by low-pass filtering the reference signal based on a first predetermined bandwidth;
     a second amplification circuit, which is configured to operably generate an adjustment signal according to a difference between the feedback signal and a fast response signal;
     a ramp signal generation circuit, which is configured to operably generate a ramp signal according to a clock signal; and
     a comparator, which is configured to operably compare the amplification signal and the ramp signal, to generate a pulse width modulation (PWM) signal, wherein the controller circuit generates the switch control signal according to the PWM signal;
   wherein the adjustment signal is configured to operably adaptively adjust the amplification signal or the ramp signal, so as to reduce a response time or to mitigate or avoid an overshoot or an undershoot of the output voltage;
   wherein a voltage level of the fast response signal is between a voltage level of the low-pass filtered signal and a voltage level of the reference signal.

2. The switching regulator of claim 1, wherein the controller circuit further includes a first low-pass filter, which is configured to operably generate the low-pass filtered signal by low-pass filtering the reference signal based on the first predetermined bandwidth.

3. The switching regulator of claim 2, wherein the controller circuit further includes a fast response signal generation circuit, which is configured to operably perform a linear weighting operation on the low-pass filtered signal and the reference signal to generate the fast response signal.

4. The switching regulator of claim 3, wherein the fast response signal generation circuit obtains an average of the low-pass filtered signal and the reference signal as the fast response signal.

5. The switching regulator of claim 2, wherein the controller circuit further includes a second low-pass filter, which is configured to operably generate the fast response signal by low-pass filtering the reference signal based on a second predetermined bandwidth; wherein the second predetermined bandwidth is larger than the first predetermined bandwidth.

6. The switching regulator of claim 1, wherein the clock signal has a fixed frequency or a frequency correlated to an inductor current flowing through the inductor.

7. The switching regulator of claim 1, wherein the controller circuit further includes a dynamic voltage regulation circuit, wherein the dynamic voltage regulation circuit changes the target level of the output voltage according to a request signal, so as to generate the reference signal and the low-pass filtered signal, to dynamically regulate the output voltage.

8. The switching regulator of claim 1, wherein the first amplification circuit includes:
   a transconductance amplifier, which is configured to operably generate a transconductance current according to a difference between the reference signal and the feedback signal, or a difference between the low-pass filtered signal and the feedback signal; and
   a compensation circuit, which is coupled to the transconductance amplifier, and is configured to operably generate the amplification signal according to the transconductance current which charges and discharges a capacitor in the compensation circuit.

9. The switching regulator of claim 1, wherein the adjustment signal is configured to adaptively adjust the ramp signal so as to adaptively adjust a conduction time or a duty of the pulse width modulation signal.

10. The switching regulator of claim 1, wherein when the target level changes from a relatively lower first target level to a relatively higher second target level, and the feedback signal is lower than the fast response signal, the amplification signal increases, and the second amplification circuit sinks current to decrease a slope of the ramp signal, so as to extend a conduction time of the power switch; and wherein when the feedback signal is higher than the fast response signal, the amplification signal decreases, to increase the slope of the ramp signal, so as to decrease an increase rate of the output voltage, for mitigating or avoiding an overshoot of the output voltage.

11. The switching regulator of claim 1, wherein when the target level changes from a relatively higher first target level to a relatively lower second target level, and the feedback signal is higher than the fast response signal, the amplification signal decreases, and the second amplification circuit sources current to increase a slope of the ramp signal, so as to extend a non-conduction time of the power switch; and wherein when the feedback signal is lower than the fast response signal, the amplification signal increases, to decrease the slope of the ramp signal, and the power switch is turned ON, so as to decrease a decrease rate of the output voltage, for mitigating or avoiding an undershoot of the output voltage.

12. A controller circuit for use in a switching regulator, wherein the switching regulator includes a power stage circuit and the controller circuit, the power stage circuit including an inductor and at least one power switch, wherein the at least one power switch is coupled to the inductor, and is configured to operate according to a switch control signal, to control a conduction status of the inductor, so as to convert an input voltage to an output voltage; wherein the controller circuit is coupled to the power stage circuit, and is configured to operably generate the switch control signal according to a feedback signal and a reference signal, wherein the feedback signal related to the output voltage and the reference signal is related to a dynamic change of a target level of the output voltage, the controller circuit comprising:
a first amplification circuit, which is configured to operably generate an amplification signal according to a difference between a low-pass filtered signal and the feedback signal, wherein the low-pass filtered signal is related to a signal generated by low-pass filtering the reference signal based on a first predetermined bandwidth;
a second amplification circuit, which is configured to operably generate an adjustment signal according to a difference between the feedback signal and a fast response signal;
a ramp signal generation circuit, which is configured to operably generate a ramp signal according to a clock signal; and
a comparator, which is configured to operably compare the amplification signal and the ramp signal, to generate a pulse width modulation (PWM) signal, wherein the controller circuit generates the switch control signal according to the PWM signal;
wherein the adjustment signal is configured to operably adaptively adjust the amplification signal or the ramp signal, to reduce a response time or to mitigate or avoid an overshoot or an undershoot of the output voltage;
wherein a voltage level of the fast response signal is between a voltage level of the low-pass filtered signal and a voltage level of the reference signal.

13. The controller circuit of claim 12, further comprising a first low-pass filter, which is configured to operably low-pass filter the reference signal to generate the low-pass filtered signal based on the first predetermined bandwidth.

14. The controller circuit of claim 13, further comprising a quick response signal generation circuit, which is configured to operably perform a linear weighting operation on the low-pass filtered signal and the reference signal to generate the fast response signal.

15. The controller circuit of claim 14, wherein the fast response signal generation circuit obtains an average of the low-pass filtered signal and the reference signal as the fast response signal.

16. The controller circuit of claim 12, further comprising a second low-pass filter, which is configured to operably generate the fast response signal by low-pass filtering the reference signal based on a second predetermined bandwidth; wherein the second predetermined bandwidth is larger than the first predetermined bandwidth.

17. The controller circuit of claim 12, wherein the clock signal has a fixed frequency or a frequency related to an inductor current flowing through the inductor.

18. The controller circuit of claim 12, further comprising a dynamic voltage regulation circuit, wherein the dynamic voltage regulation circuit changes the target level of the output voltage according to a request signal, so as to generate the reference signal and the low-pass filtered signal, to dynamically regulate the output voltage.

19. The controller circuit of claim 12, wherein the first amplification circuit includes:
a transconductance amplifier, which is configured to operably generate a transconductance current according to a difference between the reference signal and the feedback signal, or a difference between the low-pass filtered signal and the feedback signal; and
a compensation circuit, which is coupled to the transconductance amplifier, and is configured to operably generate the amplification signal according to the transconductance current which charges and discharges a capacitor in the compensation circuit.

20. The controller circuit of claim 12, wherein the adjustment signal is configured to adaptively adjust the ramp signal so as to adaptively adjust a conduction time or a duty of the pulse width modulation signal.

21. The controller circuit of claim 12, wherein when the target level changes from a relatively lower first target level to a relatively higher second target level, and the feedback signal is lower than the fast response signal, the amplification signal increases, and the second amplification circuit sinks current to decrease a slope of the ramp signal, so as to extend a conduction time of the power switch; and wherein when the feedback signal is higher than the fast response signal, the amplification signal decreases, to increase the slope of the ramp signal, so as to decrease an increase rate of the output voltage, for mitigating or avoiding an overshoot of the output voltage.

22. The controller circuit of claim 12, wherein when the target level changes from a relatively higher first target level to a relatively lower second target level, and the feedback signal is higher than the fast response signal, the amplification signal decreases, and the second amplification circuit sources current to increase a slope of the ramp signal, so as to extend a non-conduction time of the power switch; and wherein when the feedback signal is lower than the fast response signal, the amplification signal increases, to decrease the slope of the ramp signal, and the power switch is turned ON, so as to decrease a decrease rate of the output voltage, for mitigating or avoiding an undershoot of the output voltage.

23. A control method for controlling a switching regulator, comprising:
operating a power switch according to a switch control signal, to control a conduction status of an inductor, so as to convert an input voltage to an output voltage;
generating an amplification signal according to a difference between a low-pass filtered signal and a feedback signal, wherein the feedback signal is related to the output voltage and wherein the low-pass filtered signal is related to a signal generated by low-pass filtering the reference signal based on a first predetermined bandwidth, and wherein the reference signal is related to dynamic change of a target level of the output voltage;
generating an adjustment signal according to a difference between the feedback signal and a fast response signal;
generating a ramp signal according to a clock signal; and comparing the amplification signal and the ramp signal, to generate a pulse width modulation (PWM) signal, so as to generate the switch control signal according to the PWM signal;

wherein the adjustment signal is configured to operably adaptively adjust the amplification signal or the ramp signal, to reduce a response time or to mitigate or avoid an overshoot or an undershoot of the output voltage;

wherein a voltage level of the fast response signal is between a voltage level of the low-pass filtered signal and a voltage level of the reference signal.

24. The control method of claim 23, further comprising: performing a linear weighting operation on the low-pass filtered signal and the reference signal to generate the fast response signal.

25. The control method of claim 24, wherein the fast response signal is an average of the low-pass filtered signal and the reference signal.

26. The control method of claim 23, further comprising generating the fast response signal by low-pass filtering the reference signal based on a second predetermined bandwidth; wherein the second predetermined bandwidth is larger than the first predetermined bandwidth.

27. The control method of claim 23, wherein the clock signal has a fixed frequency or a frequency correlated to an inductor current flowing through the inductor.

28. The control method of claim 23, further comprising: changing the target level of the output voltage according to a request signal, so as to generate the reference signal and the low-pass filtered signal, to dynamically regulate the output voltage.

29. The control method of claim 23, wherein the adjustment signal is configured to adaptively adjust the ramp signal to adaptively adjust a conduction time or a duty of the pulse width modulation signal.

30. The control method of claim 23, wherein when the target level changes from a relatively lower first target level to a relatively higher second target level, and the feedback signal is lower than the fast response signal, the amplification signal increases, to decreases a slope of the ramp signal, so as to extend a conduction time of the power switch; and wherein when the feedback signal is higher than the fast response signal, the amplification signal decreases, to increase the slope of the ramp signal, so as to decrease an increase rate of the output voltage, for mitigating or avoiding an overshoot of the output voltage.

31. The control method of claim 23, wherein when the target level changes from a relatively higher first target level to a relatively lower second target level, and the feedback signal is higher than the fast response signal, the amplification signal decreases, to increase a slope of the ramp signal, so as to extend a non-conduction time of the power switch; and wherein when the feedback signal is lower than the fast response signal, the amplification signal increases, to decrease the slope of the ramp signal, and the power switch is turned ON, so as to decrease a decrease rate of the output voltage, for mitigating or avoiding an undershoot of the output voltage.

* * * * *